United States Patent
Mizobata et al.

(10) Patent No.: US 9,981,586 B2
(45) Date of Patent: *May 29, 2018

(54) HEADREST AND VEHICLE SEAT HAVING HEADREST

(71) Applicant: TOYOTA BOSHOKU KABUSHIKI KAISHA, Aichi-ken (JP)

(72) Inventors: Hiroshi Mizobata, Aichi-ken (JP); Shuuhei Miyake, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/155,310

(22) Filed: May 16, 2016

(65) Prior Publication Data
US 2016/0339815 A1 Nov. 24, 2016

(30) Foreign Application Priority Data
May 19, 2015 (JP) ................ 2015-101837

(51) Int. Cl.
*A47C 1/10* (2006.01)

(52) U.S. Cl.
CPC .......... *B60N 2/80* (2018.02); *B60N 2002/899* (2018.02)

(58) Field of Classification Search
CPC ........ B60N 2/48; B60N 2/68; B60N 2205/40; B60N 2/4805; B60N 2002/4888; B60N 2/482; B60N 2/4826; B60N 2/80
USPC .. 297/452.15, 452.41, 391, 404, 410, 284.1, 297/284.2, 284.6, 216.12
See application file for complete search history.

(56) References Cited

U.S. PATENT DOCUMENTS

| | | | | |
|---|---|---|---|---|
| 8,833,859 | B2 * | 9/2014 | Matsushima | ........ B60N 2/4817 297/391 |
| 9,452,697 | B2 * | 9/2016 | Okubo | ..................... B60N 2/48 |
| 9,511,695 | B2 * | 12/2016 | Okubo | ................. B60N 2/4808 |
| 9,746,048 | B2 * | 8/2017 | Okubo | .................... F16F 7/108 |
| 2012/0098316 | A1 | 4/2012 | Matsushima et al. | |

(Continued)

FOREIGN PATENT DOCUMENTS

| CN | 103459198 A | 12/2013 |
|---|---|---|
| CN | 104428163 A | 3/2015 |

(Continued)

OTHER PUBLICATIONS

U.S. Appl. No. 15/155,402 to Hiroshi Mizobata et al., which was filed on May 16, 2016.

(Continued)

*Primary Examiner* — Chi Q Nguyen
(74) *Attorney, Agent, or Firm* — Greenblum & Bernstein, P.L.C.

(57) ABSTRACT

A vehicle seat includes a seat back, and a headrest that is provided above the seat back. The headrest includes a pair of stays that form a part of a skeleton of the headrest, a pair of panel members that sandwich parts of the pair of stays from front and rear or above and below so as to connect the stays with each other, and are joined to each other through outer peripheries so as to form a space inside and form a part of the skeleton of the headrest, a cushion material that covers the pair of panel members and the parts of the pair of stays, and a dynamic damper arranged inside the space.

8 Claims, 8 Drawing Sheets

(56) References Cited

U.S. PATENT DOCUMENTS

| | | | |
|---|---|---|---|
| 2012/0112510 A1* | 5/2012 | Ishimoto | B60N 2/4228 297/408 |
| 2015/0159721 A1* | 6/2015 | Okubo | B60N 2/48 297/404 |
| 2015/0183343 A1* | 7/2015 | Okubo | B60N 2/48 297/404 |
| 2016/0121770 A1* | 5/2016 | Takahashi | B60N 2/48 297/452.18 |
| 2016/0311351 A1* | 10/2016 | Mizobata | B60N 2/48 |
| 2016/0339816 A1* | 11/2016 | Mizobata | B60N 2/48 |
| 2017/0225597 A1* | 8/2017 | Okubo | B60N 2/48 |

FOREIGN PATENT DOCUMENTS

| | | |
|---|---|---|
| JP | 60-151135 A | 8/1985 |
| JP | 09-136590 A | 5/1997 |
| JP | 2009-273519 A | 11/2009 |
| JP | 2013-010416 A | 1/2013 |
| JP | 2014-15076 | 1/2014 |
| WO | WO2014/196161 A1 | 12/2014 |

OTHER PUBLICATIONS

Chinese Office Action for CN App. No. 201610325943.0 dated Dec. 4, 2017, along with a partial English-language translation thereof.

\* cited by examiner

HEADREST AND VEHICLE SEAT HAVING HEADREST

INCORPORATION BY REFERENCE

The disclosure of Japanese Patent Application No. 2015-101837 filed on May 19, 2015 including the specification, drawings and abstract is incorporated herein by reference in its entirety.

BACKGROUND OF THE INVENTION

1. Field of the Invention

The invention relates to a headrest and a vehicle seat having the headrest.

2. Description of Related Art

A vehicle seat is disclosed, in which vibration transmitted from a vehicle body to the vehicle seat is transmitted a dynamic damper provided inside a headrest so as to make the dynamic damper resonate. Thus, vibration of the vehicle seat is converted into vibration of the dynamic damper, thereby restraining vibration of the vehicle seat. In a vehicle seat described in Japanese Patent Application Publication No. 2014-15076 (JP 2014-15076 A), a dynamic damper is arranged inside a space formed inside a headrest. To be in more detail, panel members, which serve as a case that forms a space inside, is attached to a stay serving as a skeleton member, and a weight is arranged in the space inside the panel members through an elastic member, thereby structuring a dynamic damper.

SUMMARY OF THE INVENTION

In the technology described in JP 2014-15076 A, the panel members that form the space inside is necessary in addition to the stay serving as the skeleton member of the headrest. In short, the stay only has a function of forming a skeleton of the headrest, and the panel members only have a function of forming the space inside, where the dynamic damper is arranged, and attaching the dynamic damper to the stay. Thus, it is not possible to achieve downsizing of the stay, which could make it difficult to achieve weight reduction of the headrest and the vehicle seat having the headrest.

The invention provides a light-weighted headrest, in which a space is formed inside the headrest using small-sized stays, and a dynamic damper is arranged inside the space. The invention also provides a vehicle seat having the headrest.

A vehicle seat according to the first aspect of the invention includes a seat back, and a headrest that is provided above the seat back. The headrest includes a pair of stays that form a part of a skeleton of the headrest, a pair of panel members that sandwich parts of the pair of stays from front and rear or above and below so as to connect the stays with each other, and are joined to each other through outer peripheries so as to form a space inside and form a part of the skeleton of the headrest, a cushion material that covers the pair of panel members and the parts of the pair of stays, and a dynamic damper arranged inside the space.

According to the above aspect, the outer peripheries of the pair of panel members are joined to each other in a state where the pair of panel members sandwich parts of the pair of stays. Therefore, the pair of panel members and the pair of stays are integrated, thereby forming the skeleton of the headrest. Further, the dynamic damper is attached to the skeleton of the headrest as the dynamic damper is sandwiched between the pair of panel members and arranged in the space formed inside. Thus, the parts of the stays are substituted by the pair of panel members, and downsizing of the stays is thus achieved. Therefore, weight reduction of the vehicle seat is achieved.

In the foregoing aspect, the dynamic damper may have a weight, and an elastic body that fastens the weight, and a part of the elastic body may be attached to at least one of the pair of panel members.

According to the above structure, a part of the elastic body, which fastens the weight of the dynamic damper, is attached to at least one of the pair of panel members. Therefore, the weight vibrates easily with respect to the pair of panel members, thereby restraining vibration of the vehicle seat efficiently.

In the foregoing aspect, the pair of panel members may be press-formed products of a metallic sheet, and the pair of panel members may be joined to each other by welding or squeezing.

According to the above structure, it is possible to manufacture the panel members by press-forming a metallic sheet. Also, since the outer peripheries of the panel members are joined to each other by welding or squeezing, highly productive manufacturing is possible.

In the foregoing structure, the panel members may be constituted by press-formed products that are folded up at an integral hinge and joined to each other and: the integral hinge may be formed by connecting one-side parts of press-formed products with each other.

According to the above structure, it becomes easy to position the pair of panel members when the panel members are joined to each other. Further, since the number of joining spots is reduced by an amount of the integral hinge, productivity is improved further.

A headrest according to the second aspect of the invention includes a pair of stays forming a part of a skeleton of the headrest, a pair of panel members that sandwich parts of the pair of stays from front and rear or above and below so as to connect the stays with each other, and are joined to each other through outer peripheries so as to form a space inside and form a part of the skeleton of the headrest, a cushion material that covers the pair of panel members and the parts of the pair of stays, and a dynamic damper arranged inside the space.

According to the above aspect, the outer peripheries of the pair of panel members are joined to each other in a state where the pair of panel members sandwich parts of the pair of stays. Therefore, the panel members and the pair of stays are integrated, thereby forming the skeleton of the headrest. Further, the dynamic damper is attached to the skeleton of the headrest as the dynamic damper is sandwiched between the pair of panel members and arranged in the space formed inside. Thus, the parts of the pair of stays are substituted by the pair of panel members, and downsizing of the stays is thus achieved. Therefore, weight reduction of the headrest is achieved.

In the foregoing aspect, the dynamic damper may have a weight, and an elastic body that fastens the weight, and a part of the elastic body may be attached to at least one of the pair of panel members.

According to the above structure, a part of the elastic body, which fastens the weight of the dynamic damper, is attached to at least one of the pair of panel members. Therefore, the weight vibrates easily with respect to the pair of panel members, thereby restraining vibration of the vehicle seat efficiently.

In the foregoing aspect, the pair of panel members may be press-formed products of a metallic sheet, and the pair of panel members may be joined to each other by welding or squeezing.

According to the above structure, it is possible to manufacture the panel members by press-forming a metallic sheet. Also, since the outer peripheries of the panel members are joined to each other by welding or squeezing, highly productive manufacturing is possible.

In the foregoing structure, the panel members may be constituted by press-formed products that are folded up at an integral hinge and joined to each other and: the integral hinge may be formed by connecting one-side parts of press-formed products with each other.

According to the above structure, it becomes easy to position the pair of panel members when the panel members are joined to each other. Further, since the number of joining spots is reduced by an amount of the integral hinge, productivity is improved further.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
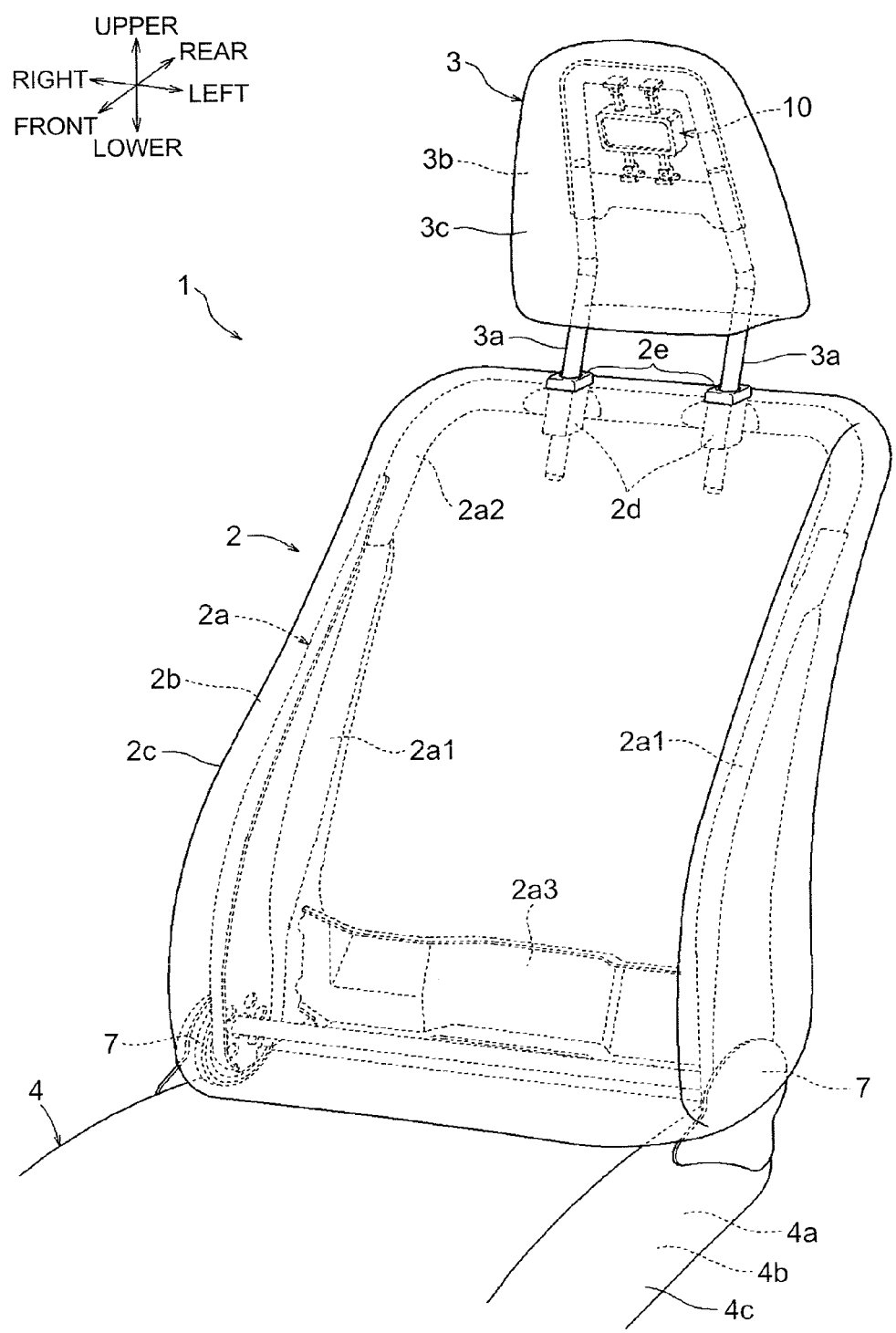
FIG. 1 is a partial perspective view of a vehicle seat according to the first embodiment of the invention.
Figure 2:
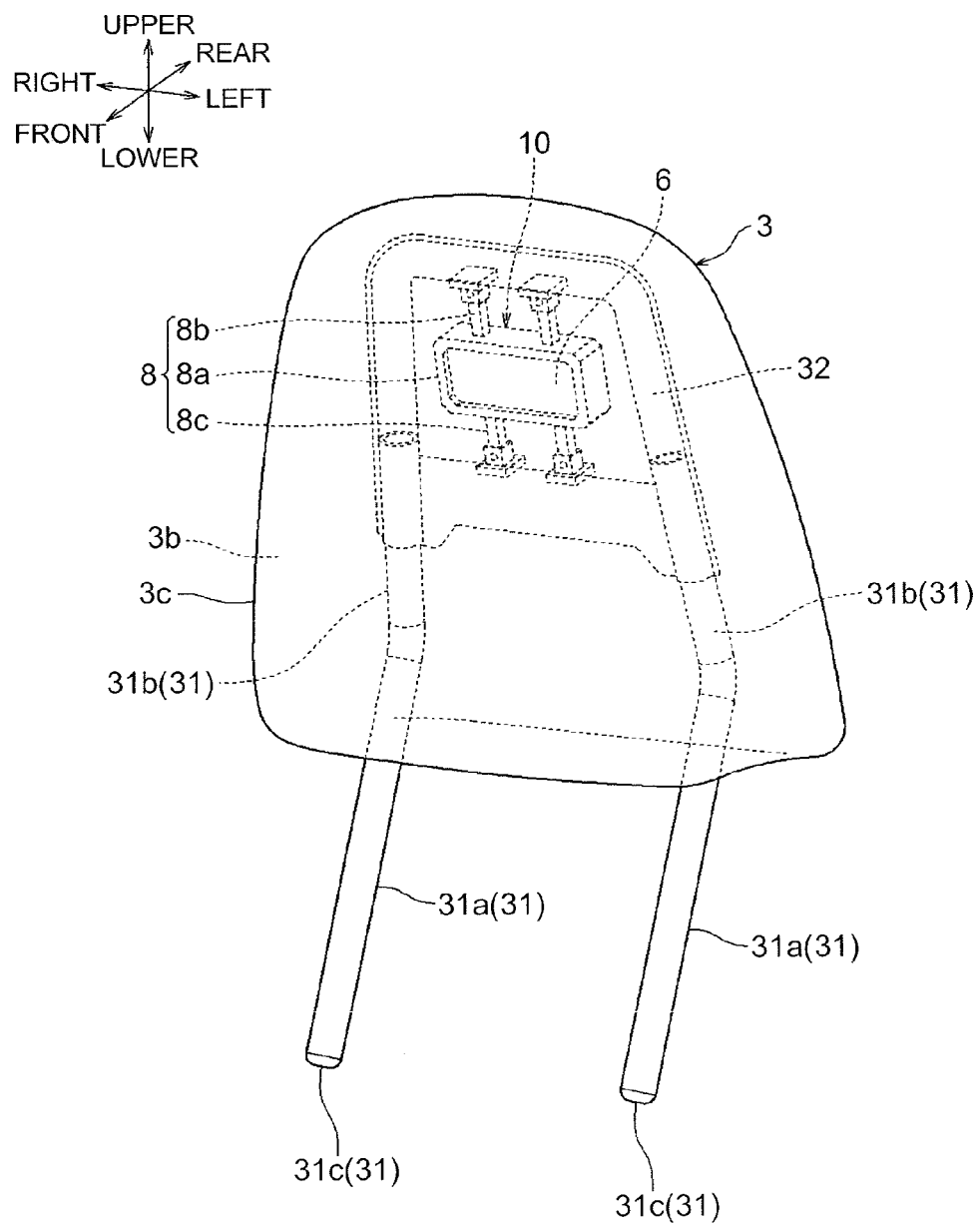
FIG. 2 is a perspective view of a headrest according to the embodiment.

FIG. 1 to FIG. 6 show the first embodiment of the invention. This embodiment is an example in which the invention is applied to a seat for an automobile. In each of the drawings, the arrows indicate directions of an automobile when a seat for an automobile is installed in an automobile. In the following explanation, description of directions is given based on these directions. A seat for an automobile 1 according to this embodiment is provided with a seat cushion 4 serving as a seating part, a seat back 2 serving as a backrest, and a headrest 3 supporting a head. Lower end parts of the seat back 2 on both sides are connected with a rear end part of the seat cushion 4 through a recliner 7 so that an angle is adjustable. Here, the seat for an automobile 1 is an example of a "vehicle seat" in the scope of claims.

As shown in FIG. 1, the seat back 2, the headrest 3, and the seat cushion 4 have frames 2a, 3a, 4a that form a skeleton, pads 2b, 3b, 4b serving as cushion materials, and skins 2c, 3c, 4c serving as skin materials, respectively. The pads 2b, 3b, 4b are placed on the frames 2a, 3a, 4a, respectively, and the pads 2b, 3b, 4b are covered with the skins 2c, 3c, 4c, respectively. The frame 2a of the seat back 2 has a pair of left and right side frames 2a1, a pipe-shaped upper frame 2a2 connecting upper parts of the side frames 2a1, and a press plate-shaped lower panel 2a3 connecting lower parts of the side frames 2a1. Here, the pad 3b is an example of a "cushion material" in the scope of claims.

Figure 3:
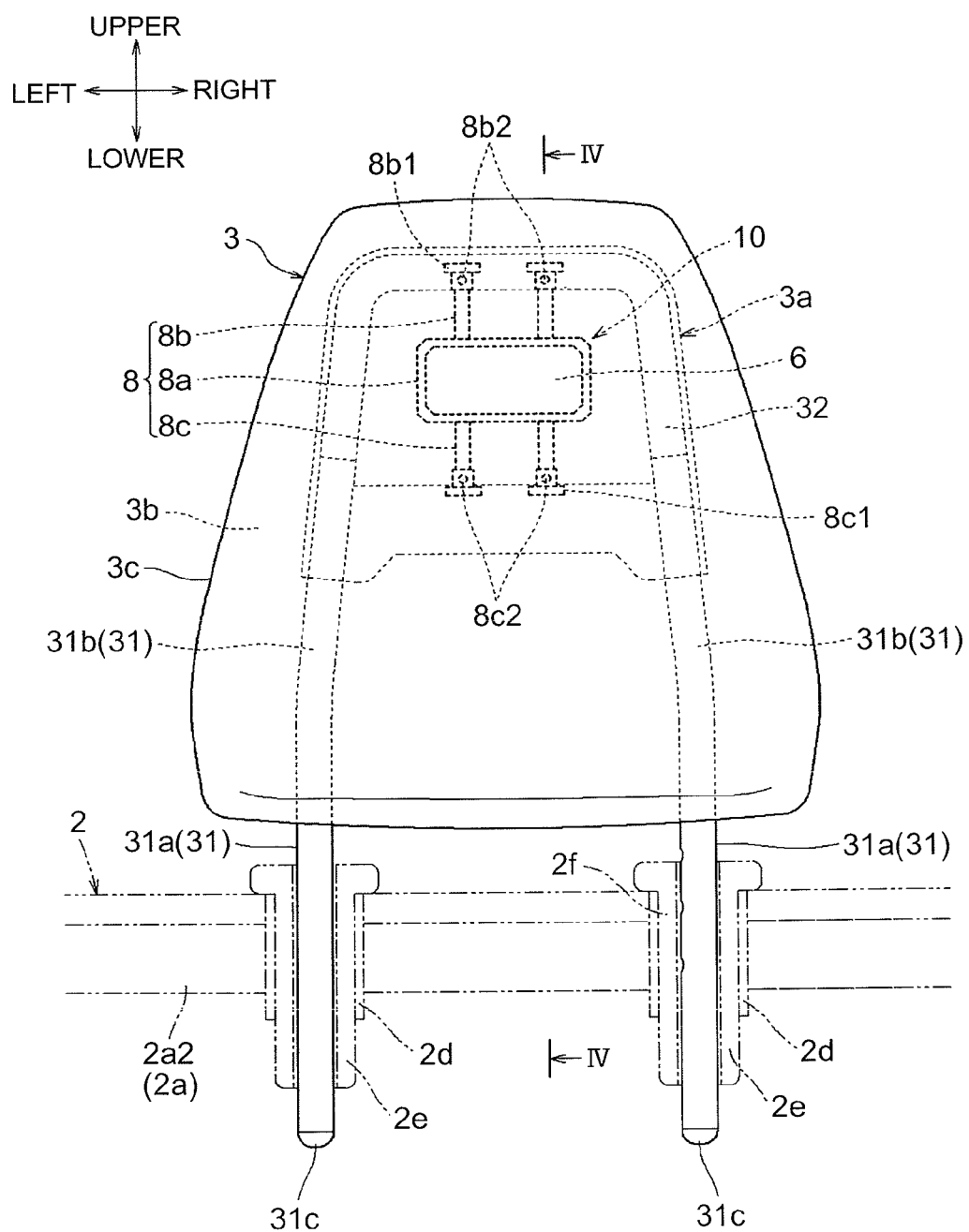
FIG. 3 is a front view of a part of a seat back and the headrest according to the embodiment.

As shown in FIG. 1 and FIG. 3, a pair of quadrangular cylindrical-shaped metallic brackets 2d are attached to the upper frame 2a2. Generally cylindrical resin support members 2e are inserted and fixed to the brackets 2d, respectively. In one of the support members 2e, a stopper 2f is provided in order to adjust height of the headrest 3 with respect to the seat back 2.

Figure 5:
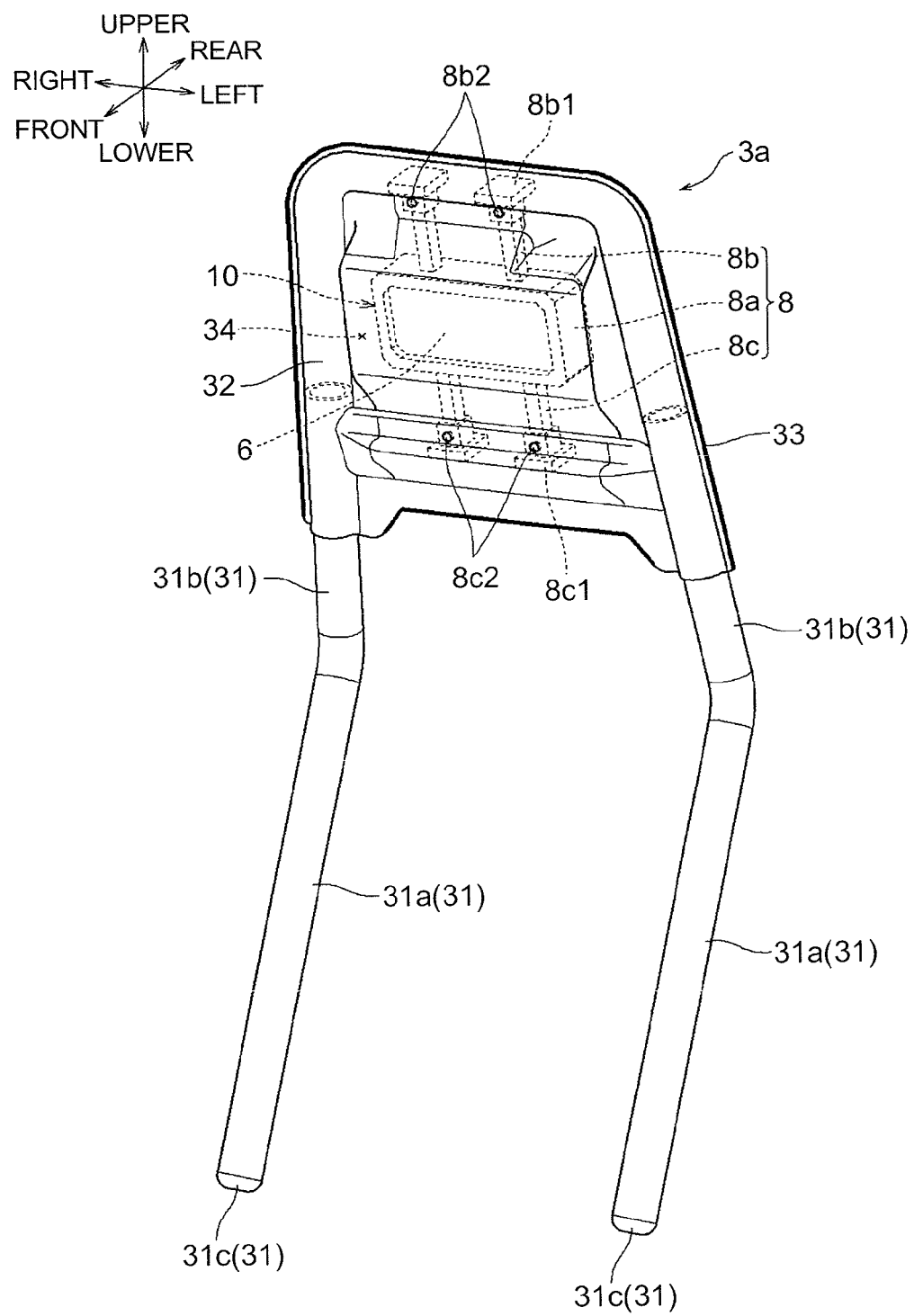
FIG. 5 is a perspective view of a state in which a dynamic damper is attached to a frame of the headrest according to the embodiment.
Figure 6:
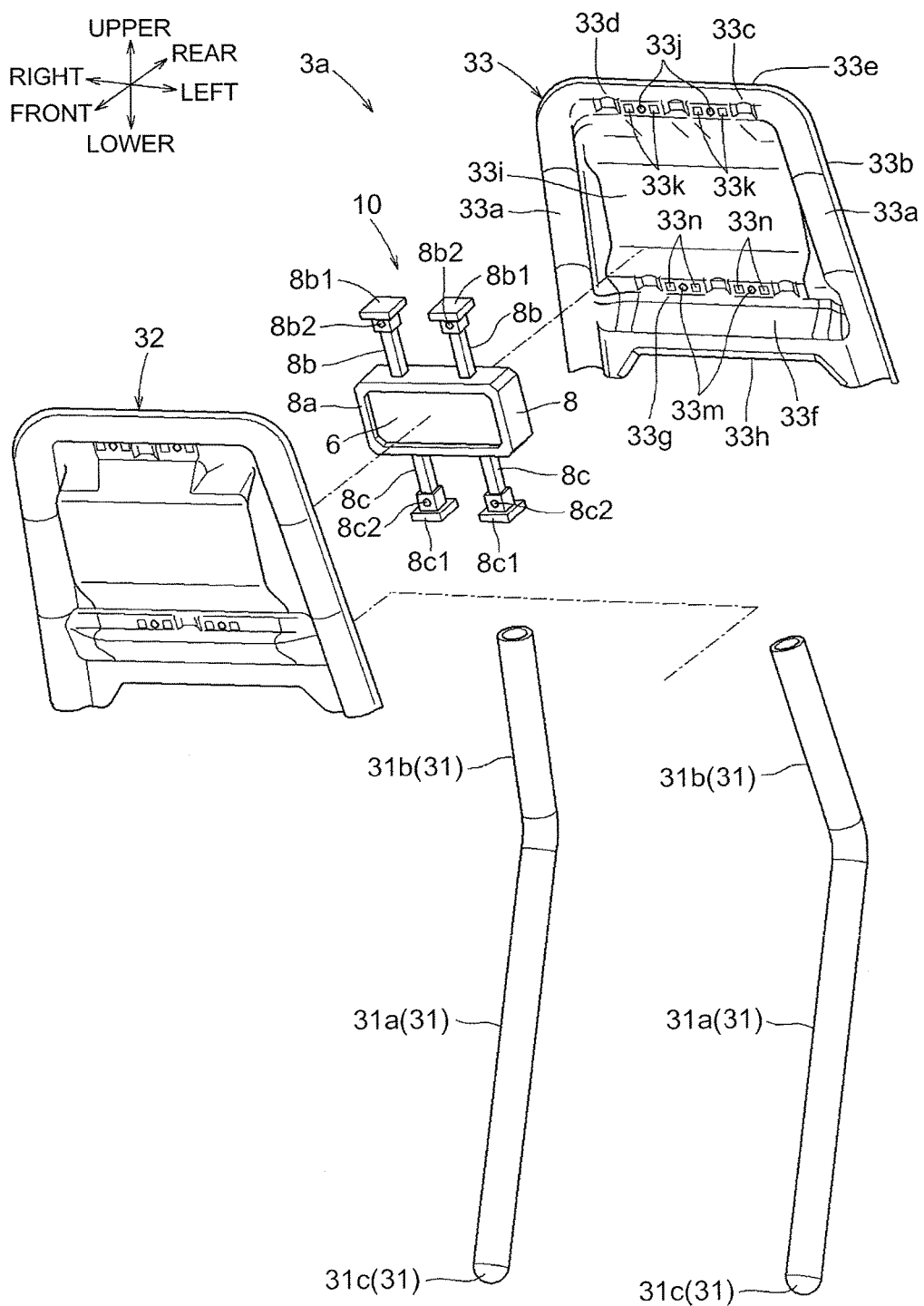
FIG. 6 is an exploded perspective view of a state where the dynamic damper is attached to the frame of the headrest according to the embodiment.

As shown in FIG. 5 and FIG. 6, the frame 3a of the headrest 3 is provided with a pair of stays 31 formed from a pipe material having a circular section, and a front panel 32 and a rear panel 33 that sandwich upper end parts of the stays 31 from front and rear and are integrated with each other. The pair of stays 31 are connected with each other by the front panel 32 and the rear panel 33, and structure the frame 3a serving as a skeleton of the headrest 3, as one integrated body.

The stay 31 has a vertical pillar part 31a extending in the upper and lower direction, and a panel mounting part 31b that extends from an upper end of the vertical pillar part 31a in the front direction and also towards the center of the headrest. A round shaped part 31c is provided in a lower end part of the vertical pillar part 31a so as to conform to regulations regarding interior projections. As shown in FIG. 3, the vertical pillar parts 31a are inserted into the support members 2e and attached to the seat back 2. In one of the stays 31, a plurality of grooves (not shown) are formed, and the stays 31 are positioned with respect to the support members 2e by the grooves and the stopper 2f. Thus, height of the headrest 3 with respect to the seat back 2 is adjusted. The front panel 32 and the rear panel 33 are examples of "panel members" in the scope of claims.

As shown in FIG. 5 and FIG. 6, the front panel 32 and the rear panel 33 are press-formed components made from a steel plate, and have the same external shape, which is a generally trapezoidal shape, seen in the front and rear direction. The front panel 32 has a half shell shaped form that expands so as to project in an approximately front direction. The rear panel 33 has a half shell shaped form that expands so as to project in an approximately rear direction. When a shell shape is formed by joining a rear end part of the front panel 32 and a front end part of the rear panel 33 to each other, a space 34 is formed between the front panel 32 and the rear panel 33, in which a later-described dynamic damper 10 is arranged. The front panel 32 and the rear panel 33 are formed into shapes that are generally symmetrical with respect to a joining surface when the front panel 32 and the rear panel 33 are joined into the shell shape. Therefore, detailed explanation is given regarding the shape of the rear panel 33 as a representative.

Figure 4:
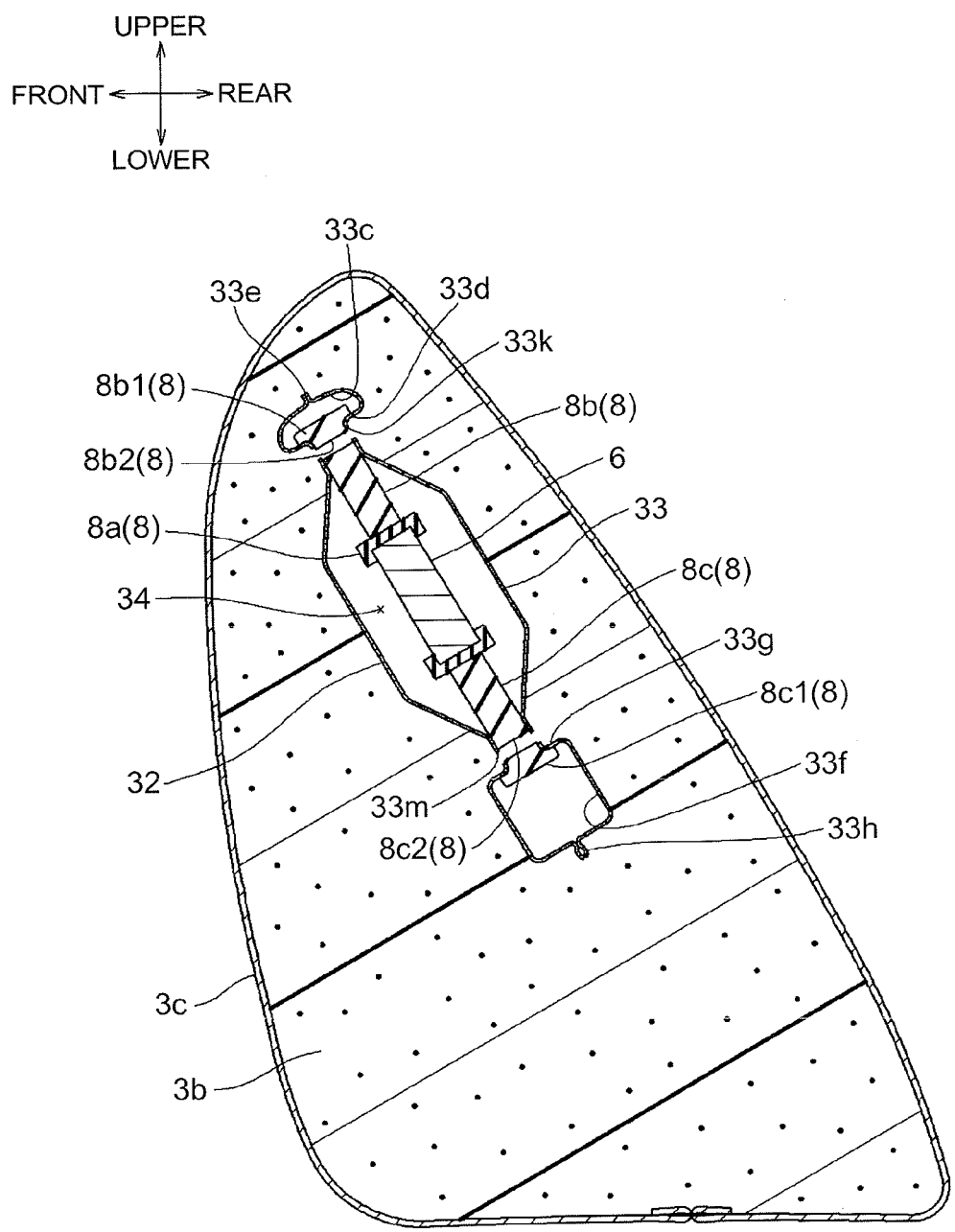
FIG. 4 is a sectional view taken along the arrow line IV-IV in FIG. 3

As shown in FIG. 6, vertical groove parts 33a are provided in left and right end parts of the rear panel 33. Each of the vertical groove parts 33a has an arc-shaped section having an inner diameter slightly larger than an outer diameter of the stay 31. When the rear panel 33 is joined to the front panel 32 into the shell shape, the vertical groove parts 33a are used to sandwich the panel mounting parts 31b of the stays 31 together with vertical groove parts of the front panel 32, and integrate the stay 31, the front panel 32, and the rear panel 33. Flange parts 33b to be joined to the front panel 32 by welding are provided in outer end parts of the vertical groove parts 33a. As shown in FIG. 4 and FIG. 6, an upper transverse groove part 33c having a generally U-shaped section is provided in an upper end part of the rear panel 33. A lower wall surface 33d of the upper transverse groove part 33c is used to engage and attach a part of the later-described dynamic damper 10 together with a lower wall surface of an upper transverse groove part of the front panel 32 when the rear panel 33 is joined to the front panel 32 into the shell shape. A flange part 33e to be joined to the front panel 32 by welding is provided in an upper end part of the upper transverse groove part 33c. The flange parts 33b and the flange part 33e are provided continuously without an interval. A lower transverse groove part 33f having a generally U-shaped section is provided in a lower end part of the rear panel 33 between the left and right vertical groove parts 33a. An upper wall surface 33g of the lower transverse groove part 33f is used to engage and attach a part of the later-described dynamic damper 10 together with an upper wall surface of a lower transverse groove part of the front panel 32 when the rear panel 33 is joined to the front panel 32 into the shell shape. A flange part 33h to be joined to the front panel 32 by welding is provided in a lower end part of the lower transverse groove part 33f. A bulged part 33i projecting to the rear is formed in a center part of the rear panel 33 surrounded by the vertical groove parts 33a, the upper transverse groove part 33c, and the lower transverse groove part 33f. When the rear panel 33 is joined to the front panel 32 into the shell shape, the bulged part 33i forms the space 34, in which the dynamic damper 10 is arranged, together with a bulged part of the front panel 32. Further, the front panel 32 and the rear panel 33 abut on each other around the space 34, thereby forming a region that can be welded. Details of a structure for arranging the dynamic damper 10 are described after explanation of the structure of the dynamic damper 10.

As shown in FIG. 6, the dynamic damper 10 is provided with a weight 6, and an elastic member 8 that elastically supports the weight 6 so as to be able to oscillate with respect to the front panel 32 and the rear panel 33. The elastic member 8 is an example of an "elastic body" in the scope of claims.

The weight 6 is a solid component having a generally rectangular parallelepiped shape made from metal such as a steel material. Although the material for the weight 6 is not limited to metal, use of metal is effective to reduce the size of the dynamic damper 10 because of its large specific gravity. The shape of the weight 6 is not limited to the generally rectangular parallelepiped shape, and may be a wide range of shapes such as a disc shape, a polygonal pillar shape, and a spherical shape.

The elastic member 8 is a member made from styrene-butadiene rubber or ethylene-propylene rubber, which is integrated with the weight 6 by setting the weight 6 inside a mold for rubber molding and performing vulcanized adhesion inside the mold. As shown in FIG. 4 and FIG. 6, the elastic member 8 has a weight covering part 8a covering the weight 6, a pair of upper pillar parts 8b extending upwardly from the weight covering part 8a, and a pair of lower pillar parts 8c extending downwardly from the weight covering part 8a. As shown in FIG. 4, a part of the weight covering part 8a, which covers and holds upper, lower, left and right end parts of the weight 6, is integrated with the weight 6 in a state where the upper, lower, left and right end parts of the weight 6 are buried inside the weight covering part 8a, and are thus unlikely to come off. Upper pillar parts 8b have pillar-shaped forms having square transverse sections, and rib parts 8b1 overhanging to the front, rear, left and right are provided in upper end parts of the upper pillar parts 8b. Further, through-holes 8b2 are provided, which pass through slightly below the rib parts 8b1 of the upper pillar parts 8b in the front and rear direction. Lower pillar parts 8c have pillar-shaped forms having square transverse sections, and rib parts 8c1 overhanging to the front, rear, left and right are provided in lower end parts of the lower pillar parts 8c. Further, through-holes 8c2 are provided, which pass through slightly above the rib parts 8c 1 of the lower pillar parts 8c in the front and rear direction. How to attach the elastic member 8 to the weight 6 is not limited to integral forming. For example, a separately-formed elastic member 8 may be attached mechanically such as by insertion and screwing, or by adhesion. The material for the elastic member 8 is not limited to rubber, and may be resin such as thermoplastic elastomer. Here, the upper pillar parts 8b and the lower pillar parts 8c are examples of a "leg part" in the scope of claims.

With reference to FIG. 4 and FIG. 6, explanation is given regarding a structure and method for attaching the dynamic damper 10 to the front panel 32 and the rear panel 33. A pair of engagement holes 33j are provided equidistantly from the center line in the left and right direction slightly below the lower wall surface 33d of the upper transverse groove part 33c of the rear panel 33. The interval between the left and right engagement holes 33j is set to be equal to a distance between the through-holes 8b2 provided in the pair of upper pillar parts 8b of the dynamic damper 10. Projecting parts 33k projecting to the front are provided on both left and right sides of each of the engagement holes 33j. The interval between the projecting parts 33k sandwiching the engagement hole 33j is set to be slightly larger than a width of the upper pillar part 8b in the left and right direction. A pair of engagement holes 33m are provided equidistantly from the center line in the left and right direction slightly above the upper wall surface 33g of the lower transverse groove part 33f of the rear panel 33. The interval between the left and right engagement holes 33m is set to be equal to a distance between the through-holes 8c2 provided in the pair of lower pillar parts 8c of the dynamic damper 10. Projecting parts 33n projecting to the front are provided on both left and right sides of each of the engagement holes 33m. The interval between the projecting parts 33n sandwiching the engagement hole 33m is set to be slightly larger than the width of the lower pillar part 8c in the left and right direction. The intervals between the engagement holes 33j and the engagement holes 33m on the left and right are set to be slightly larger than distances between the through-holes 8b2 and the through-holes 8c2 of the dynamic damper 10, respectively. Thus, when the engagement holes 33j and the engagement holes 33m of the rear panel 33 on the left and right sides are mated with the through-holes 8b2 and the through-holes 8c2 of the dynamic damper 10 on the left and right sides, respectively, the upper pillar parts 8b and the lower pillar parts 8c of the dynamic damper 10 are stretched. Engagement holes and projecting parts are also provided in the front panel 32 at positions symmetrical to those of the rear panel 33 with respect to the joining surface when the front panel 32 and the rear panel 33 are joined to each other into the shell shape.

Explanation is given regarding a method for attaching the dynamic damper 10 to the frame 3a. In FIG. 6, the rear panel 33 and the left and right stays 31 are arranged on a clamping jig (not shown) that supports the flange parts 33b, 33e, 33h of the rear panel 33 facing upwards, and supports the left and right stays 31 at appropriate positions with respect to the rear panel 33. From the clamping jig, four columnar positioning pins in total are erected vertically to the surface to be joined to the front panel 32 at positions corresponding to the engagement holes 33j and the engagement holes 33m. Each of the columnar positioning pins has an outer diameter that is slightly smaller than those of the engagement holes 33j and the engagement holes 33m. Therefore, when the rear panel 33 is placed on the clamping jig, the four positioning pins extend upwardly through the engagement holes 33j and the engagement holes 33m of the rear panel 33. In this state, the dynamic damper 10 is placed and set so that the four positioning pins pass though the through-holes 8b2 and the through-holes 8c2 of the dynamic damper 10. In short, the two positioning pins passing through the engagement holes 33j are passed through the two through-holes 8b2 of the dynamic damper 10, and the two positioning pins passing through the engagement holes 33m are passed through the two through-holes 8c2 of the dynamic damper 10. At this time, since distances between the through-holes 8b2 and the through-holes 8c2 of the dynamic damper 10 are shorter than distances between the engagement holes 33j and the engagement holes 33m of the rear panel 33, tension is applied to the upper pillar parts 8b and the lower pillar parts 8c of the elastic member 8. In this state, the rib parts 8b1 of the upper pillar parts 8b are engaged with the lower wall surface 33d of the upper transverse groove part 33c of the rear panel 33, and the rib parts 8c1 of the lower pillar parts 8c are engaged with the upper wall surface 33g of the lower transverse groove part 33f of the rear panel 33. By covering this with the front panel 32, the four positioning pins pass through the four engagement holes of the front panel 32, and the rib parts 8b 1 of the upper pillar parts 8b are engaged with the lower wall surface of the upper transverse groove part of the front panel 32, and the rib parts 8c1 of the lower pillar parts 8c are engaged with the upper wall surface of the lower transverse groove part of the front panel 32. In this state, contact parts of the outer peripheral flange parts of the front panel 32 and the rear panel 33, inner parts of the vertical groove parts 33a and the upper transverse groove part 33c, and the left and right stays 31 are fixed to each other by welding, and the clamping jig is removed. At this time, the rib parts 8b1 of the upper pillar parts 8b and the rib parts 8c1 of the lower pillar parts 8c of the dynamic damper 10 are engaged with the lower wall surfaces of the upper transverse groove parts and the upper wall surfaces of the lower transverse groove parts of the front panel 32 and the rear panel 33, respectively. Therefore, even when the positioning pins are removed, tension remains applied to the upper pillar parts 8b and the lower pillar parts 8c. Further, the upper pillar parts 8b are supported by being sandwiched between the projecting parts 33k so as not to be able to move in the left and right direction, and the lower pillar parts 8c are supported by being sandwiched between the projecting parts 33n so as not to be able to move in the left and right direction. Thus, the dynamic damper 10 is supported so as not to be able to move with respect to the frame 3a in any of the upper and lower, and left and right directions.

A method for manufacturing the headrest 3 is explained. The frame 3a, to which the foregoing dynamic damper 10 is attached, is covered with the skin 3c formed into a bag shape, and then set in a mold for urethane foam molding having a cavity corresponding to an external shape of the headrest 3. A foamed urethane material is injected into the skin 3c, and removed from the mold after foam molding is completed, thereby obtaining the headrest 3. The dynamic damper 10 is arranged inside the space 34 formed by the front panel 32 and the rear panel 33, and outer periphery parts of the front panel 32 and the rear panel 33 are sealed by welding. Therefore, during the foam molding of the foamed urethane material, the foamed urethane material is restrained from entering the space 34. Hence, a sufficient space 34 is ensured for the dynamic damper 10 to vibrate.

The embodiment structured as stated above provides the following action effects. By attaching the front panel 32 and the rear panel 33 so as to sandwich the left and right stays 31 from the front and the rear, the space 34 is formed in which the dynamic damper 10 is arranged. At this time, the left and right stays 31 are integrated with the front panel 32 and the rear panel 33 and function as the skeleton of the headrest 3. The left and right stays 31 are divided from each other, and a part connecting upper parts of the left and right stays 31 with each other is omitted. Therefore, it is possible to reduce the size of the stays, and weight reduction is thus achieved. In the dynamic damper 10, the upper pillar parts 8b and the lower pillar parts 8c of the elastic member 8, which is integrated with the weight 6, are attached to the front panel 32 and the rear panel 33. Because of this, it is easier for the weight 6 to vibrate with respect to the front panel 32 and the rear panel 33, and it is possible to restrain vibration of the seat for an automobile 1 efficiently. Further, the front panel 32 and the rear panel 33 are press-formed products of a metallic sheet, and it is possible to join the outer peripheries of the front panel 32 and the rear panel 33 to each other by welding. Therefore, highly productive manufacturing is possible.

Figure 7:
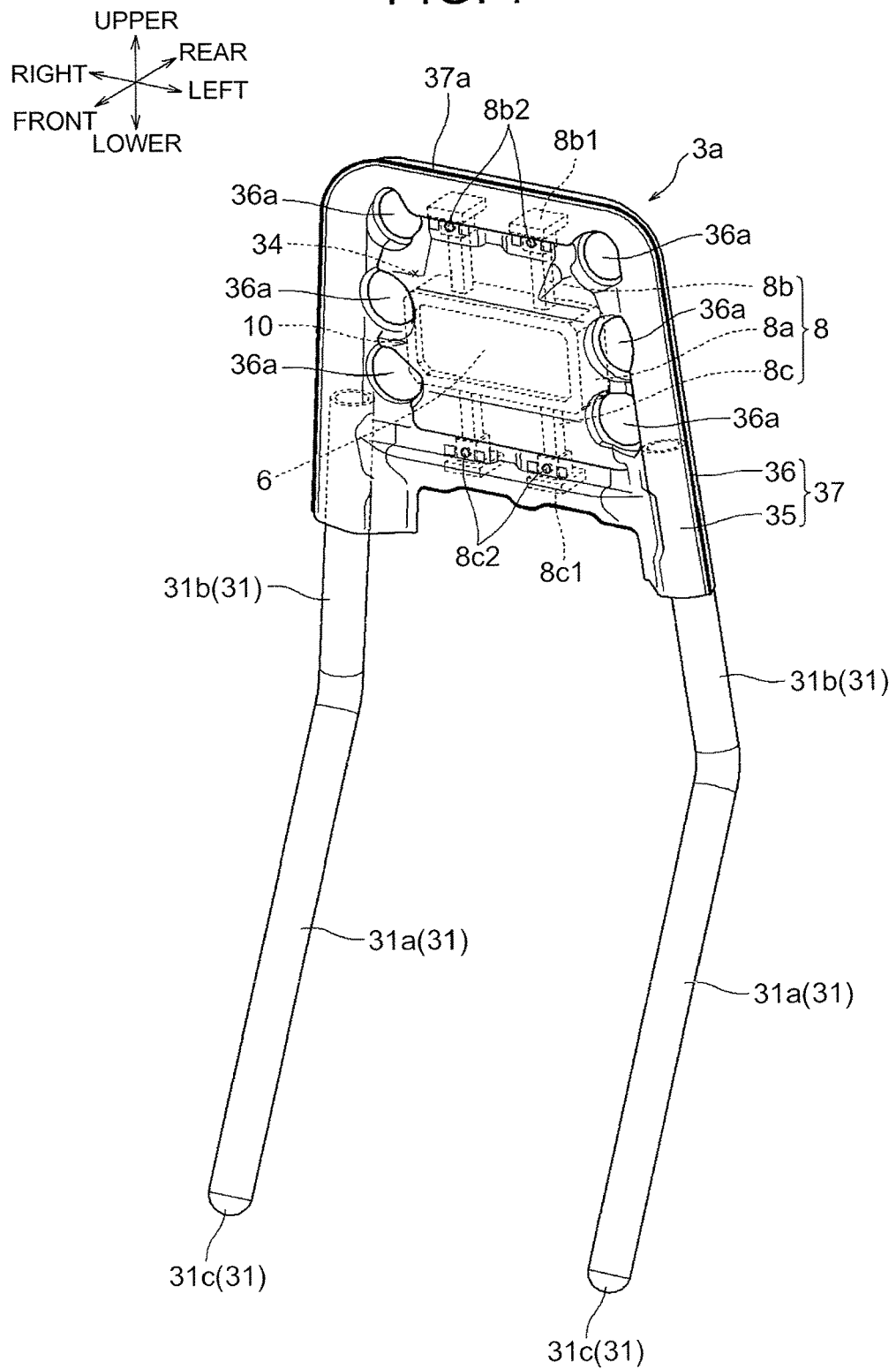
FIG. 7 is a perspective view of a state where a dynamic damper is attached to stays according to the second embodiment of the invention.
Figure 8:
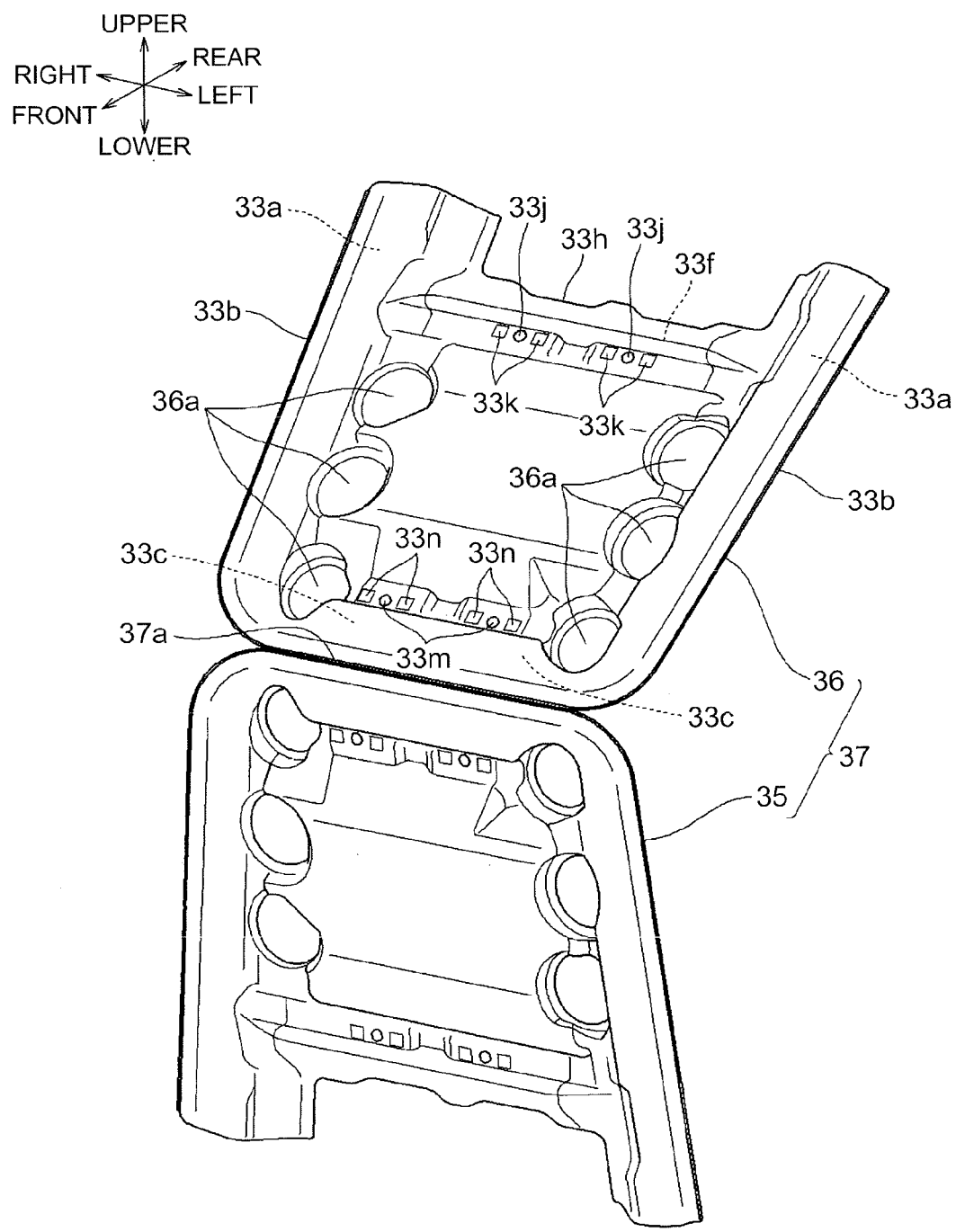
FIG. 8 is a perspective view of a state before a panel member of a headrest according to the embodiment is attached to stays.

FIG. 7 and FIG. 8 show the second embodiment of the invention. With regard to the structures duplicated with those of the first embodiment, the same reference numerals are used in the drawings and explanation is omitted. Differences from the first embodiment are that a front panel 35 and a rear panel 36 are connected by an integral hinge part 37a, thereby forming a single panel 37, and that inner parts of vertical groove parts and upper transverse groove parts of the front panel 35 and the rear panel 36 are combined with each other by squeezing (caulking). Similarly to the first embodiment, the front panel 35 and the rear panel 36 are formed into generally symmetrical shapes with respect to a joining surface when the front panel 35 and the rear panel 36 are joined to each other into a shell shape. Therefore, the detailed explanation is given regarding the shape of the rear panel 36 as a representative. Three circular flat parts 36a are provided in the upper and lower direction on an inner side of each of left and right vertical groove parts 33a for performing squeezing with the front panel 35. The six flat parts 36a are structured so as to be in contact with flat parts of the front panel 35, respectively, when the front panel 35 and the rear panel 36 are joined to each other into the shell shape. By performing squeezing of each of the flat parts in this state, the front panel 35 and the rear panel 36 are combined with each other. The panel 37 is press-formed while making the joining surface between the front panel 35 and the rear panel 36 into a flat shape. Similarly to the first embodiment, the rear panel 36 part of the panel 37 is placed on a clamping jig, and a dynamic damper 10 and left and right stays 31 are arranged. In this state, the front panel 35 part is folded back using the integral hinge part 37a as a hinge, put on top of the rear panel 36 part, and squeezing of the six flat parts 36a is performed. Then, contact parts between flange parts 33b, 33h in the outer peripheries and the left and right stays 31 are welded and fixed to each other, and the clamping jig is removed.

In the second embodiment structured as stated above, similarly to the first embodiment, it is possible to form the space 34, in which the dynamic damper 10 is arranged, by attaching the front panel 35 and the rear panel 36 so as to sandwich the left and right stays 31 from the front and the rear. At this time, the left and right stays 31 are integrated with the front panel 35 and the rear panel 36, and function as the skeleton of the headrest 3. The left and right stays 31 are divided from each other, and a part connecting upper parts of the left and right stays 31 with each other is omitted. Therefore, it is possible to reduce the size of the stays, and weight reduction is thus achieved. Since the front panel 35 and the rear panel 36 are connected with each other through the integral hinge part 37a, it becomes easier to position the front panel 35 and the rear panel 36 when joined. Further, since the number of joining spots in the outer peripheries of the front panel 35 and the rear panel 36 is reduced by an amount of the integral hinge part 37a, productivity is improved further.

Although the specific embodiments have been explained so far, the invention is not limited to the external appearance and structures of those embodiments, and various changes, additions, deletions may be made without departing from the gist of the invention, for example, as follows.

In the foregoing embodiment, the dynamic damper 10 is attached to the front panel 35 and the rear panel 36 by sandwiching parts of the upper pillar parts 8b and the lower pillar parts 8c between the front panel 35 and the rear panel 36. The invention is not limited to this, and parts of the upper pillar parts 8b and the lower pillar parts 8c may be attached to the front panel 35 or the rear panel 36 by mechanical means such as fitting and screw fastening, or adhesion, and so on.

In the foregoing embodiment, a rubber material such as styrene-butadiene rubber and ethylene-propylene rubber is applied as a material for the elastic member 8. However, the invention is not limited to this, and thermoplastic resin having an adhesive property, such as modified polypropylene resin may be used. In this case, it is possible to form the elastic member 8 integrally with the weight 6 by injection molding. Generally, a formed product of modified polypropylene resin has higher modulus of elasticity than that of a formed product of a rubber material. Therefore, in order to facilitate bending deformation, sectional shapes of the upper pillar parts 8b and the lower pillar parts 8c may be elaborated to provide weakened parts or the like, so that deformation happens easily.

In the foregoing embodiments, two upper pillar parts 8b and two lower pillar parts 8c of the elastic member 8 are arranged respectively as pairs in parallel to each other in the upper and lower direction. However, the invention is not limited to this, the number of pillar parts may be one, three or more, and the pillar parts may be arranged in the left and right direction. Moreover, the pillar parts are not necessarily arranged in parallel to each other.

In the foregoing embodiments, the outer periphery parts of the front panel 32, 35 and the rear panel 33, 36 are joined to each other by welding. However, the invention is not limited to this, and the joining may be performed by squeezing.

In the foregoing embodiment, the front panel 32, 35 and the rear panel 33, 36 are joined to each other by welding or squeezing the inner parts of the vertical groove parts 33a and the upper transverse groove parts 33c (the outer periphery part of the space 34). The invention is not limited to this, and the front panel 32, 35 and the rear panel 33, 36 may be joined to each other only in outer periphery parts.

In the foregoing embodiment, the invention is applied, but not limited to, a seat for an automobile, and may also be applied to seats for a railway vehicle, an airplane, a ship, and so on.

What is claimed is:

1. A vehicle seat comprising:
a seat back; and
a headrest that is provided above the seat back and includes a pair of stays that form a first part of a skeleton of the headrest, a pair of panel members that sandwich respective parts of the pair of stays from front and rear or above and below so as to connect the stays with each other, and are joined to each other through outer peripheries so as to form a space inside and form a second part of the skeleton of the headrest, a cushion material that covers the pair of panel members and portions of the pair of stays, and a dynamic damper arranged inside the space.

2. The vehicle seat according to claim 1, wherein:
the dynamic damper has a weight and an elastic body that fastens the weight; and
a part of the elastic body is attached to at least one of the pair of panel members.

3. The vehicle seat according to claim 1, wherein:
the pair of panel members are press-formed products of a metallic sheet; and
the pair of panel members are joined to each other by welding or squeezing.

4. The vehicle seat according to claim 3, wherein:
the panel members comprise press-formed products that are folded up at an integral hinge and joined to each other.

5. A headrest for a vehicle seat, comprising:
a pair of stays forming a first part of a skeleton of the headrest;
a pair of panel members that sandwich respective parts of the pair of stays from front and rear or above and below so as to connect the stays with each other, and are joined to each other through outer peripheries so as to form a space inside and form a second part of the skeleton of the headrest;
a cushion material that covers the pair of panel members and portions of the pair of stays; and
a dynamic damper arranged inside the space.

6. The headrest according to claim 5, wherein:
the dynamic damper has a weight and an elastic body that fastens the weight; and
a part of the elastic body is attached to at least one of the pair of panel members.

7. The headrest according to claim 5, wherein:
the pair of panel members are press-formed products of a metallic sheet; and
the pair of panel members are joined to each other by welding or squeezing.

8. The headrest according to claim 7, wherein:
the panel members comprise press-formed products that are folded up at an integral hinge and joined to each other.

* * * * *